United States Patent
Lee et al.

(10) Patent No.: US 8,098,422 B2
(45) Date of Patent: Jan. 17, 2012

(54) WAVELENGTH CONVERSION DEVICE PACKAGE

(75) Inventors: Hyung Man Lee, Seongnam-si (KR); Han Young Lee, Yongin-si (KR); Woo Seok Yang, Seong Nam si (KR); Woo Kyung Kim, Seongnam si (KR)

(73) Assignee: Korea Electronics Technology Institute, Gyeonggi-do (KR)

( * ) Notice: Subject to any disclaimer, the term of this patent is extended or adjusted under 35 U.S.C. 154(b) by 0 days.

(21) Appl. No.: 12/472,918

(22) Filed: May 27, 2009

(65) Prior Publication Data

US 2010/0073761 A1   Mar. 25, 2010

(30) Foreign Application Priority Data

Sep. 19, 2008 (KR) .................. 10-2008-0092286

(51) Int. Cl.
*G02F 1/35* (2006.01)
(52) U.S. Cl. ............. 359/326; 359/328; 372/22; 372/34
(58) Field of Classification Search .......... 359/326–330; 372/21, 92, 101, 107–108; 385/93
See application file for complete search history.

(56) References Cited

U.S. PATENT DOCUMENTS

| | | | |
|---|---|---|---|
| 5,013,129 A | 5/1991 | Harada et al. | 350/96.29 |
| 5,022,729 A | 6/1991 | Tamada et al. | 350/96.12 |
| 5,036,220 A | 7/1991 | Byer et al. | 307/427 |
| 5,379,311 A | 1/1995 | McFarlane et al. | 372/41 |
| 5,546,220 A | 8/1996 | Endo et al. | 359/332 |
| 5,761,226 A * | 6/1998 | Gupta | 372/22 |
| 5,854,802 A * | 12/1998 | Jin et al. | 372/22 |
| 5,854,870 A | 12/1998 | Helmfrid et al. | 385/122 |
| 7,039,077 B2 | 5/2006 | Furukawa et al. | 372/21 |
| 7,239,654 B2 * | 7/2007 | Imaki et al. | 372/21 |
| 7,648,290 B2 * | 1/2010 | Feve et al. | 385/93 |
| 2002/0105045 A1 * | 8/2002 | Kawamura | 257/467 |
| 2004/0258109 A1 * | 12/2004 | Tojo et al. | 372/32 |
| 2008/0144678 A1 * | 6/2008 | Lu et al. | 372/22 |
| 2011/0026548 A1 * | 2/2011 | Tamaya et al. | 372/21 |

FOREIGN PATENT DOCUMENTS

JP    07058416 A   *   3/1995

* cited by examiner

*Primary Examiner* — Hemang Sanghavi
(74) *Attorney, Agent, or Firm* — Ohlandt, Greeley, Ruggiero & Perle, L.L.P.

(57) ABSTRACT

A nonlinear optical device is provided. More specifically, a wavelength conversion device package with less optical loss stabilizes optical alignment under an external environmental change, for example, in a temperature variation by providing a temperature regulating block and a temperature sensor to an optical oscillator and a wavelength modulator and fixing a flexible optical transmitter to the optical oscillator and the wavelength modulator.

The wavelength conversion device package includes an optical oscillator comprising a light source for emitting a light; a flexible optical transmitter for transferring the light emitted from the optical oscillator to a wavelength modulator; and the wavelength modulator for receiving the light from the optical transmitter and radiating a wavelength-modulated light.

14 Claims, 16 Drawing Sheets

WAVELENGTH CONVERSION DEVICE PACKAGE

PRIORITY

This application claims the benefit under 35 U.S.C. §119(a) to a Korean patent application filed in the Korean Intellectual Property Office on Sep. 19, 2008 and assigned Serial No. 2008-0092286, the entire disclosure of which is hereby incorporated by reference.

BACKGROUND OF THE INVENTION

1. Field of the Invention

The present invention relates generally to a nonlinear optical device. More particularly, the present invention relates to a wavelength conversion device package with less optical loss for stabilizing optical alignment under an external environmental change, for example, in a temperature variation by providing a temperature regulating block and a temperature sensor to an optical oscillator and a wavelength modulator and fixing a flexible optical transmitter to the optical oscillator and the wavelength modulator.

2. Description of the Related Art

A laser light source technology using a polarization-inverted nonlinear chip is applied in various manners. For example, Difference Frequency Mixing, Sum Frequency Mixing, or Optical Parametric Oscillator can be achieved.

To produce the wavelength light source in the visible light band, a second harmonic generation which is a special form of the frequency, is adopted. The second harmonic generation projects a pumping light source having the low frequency into a polarization-inverted nonlinear optical waveguide and converts to a light source having the double frequency. In theory, the power of the second harmonic light source is determined in proportion to the square of the incident pumping light source power and the square of the length of the nonlinear chip. However, the conversion efficiency of 100% is not attained because of a loss in the optical waveguide, an absorption loss, an optical interconnection loss, and so on. A representative example of the second harmonic generation using the nonlinearity is a wavelength conversion laser device.

In the manufacture of the wavelength conversion laser using the nonlinearity, important variables include a nonlinear coefficient value of a crystal, a length of a nonlinear sample, a power of the input pumping light source, a line width of the input pumping light source, an alignment loss and a temperature stabilization of the pumping light source and the optical waveguide, a mode of the optical waveguide, and a waveguide loss of the optical waveguide. To package the waveguide including the polarization-inverted area, it is necessary to apply two temperature stabilization modules to the laser diode and the polarization-inverted waveguide respectively. In so doing, the misalignment is caused according to respective temperature stabilization set values and thus the optical connection power varies. The location change of about 1 micron gives rise to the optical connection power variation of 10%. In result, disadvantageously, the power of the wavelength-converted light source is subject to the loss. A power conversion efficiency to the wavelength conversion light source is proportional to the power of the input pumping light source. Correspondingly, the power loss of 10% leads to the conversion efficiency reduction of 10%.

FIG. 1 is a diagram of a conventional nonlinear optical oscillator using a laser diode.

The conventional nonlinear optical oscillator includes a laser diode 120 for outputting the laser, an optical condenser lens 150 for condensing the output laser and projecting the condensed laser to a Ti diffused waveguide 160 of which polarization 130 is periodically inverted on a ferroelectric crystal 140, and an optical collimating lens 170 for calibrating the focus of the laser light output from the optical waveguide 160.

The conventional Ti diffused waveguide features the waveguide mode control and the minimum waveguide loss, whereas it suffers a material problem in a photorefractive effect. The photorefractive effect indicates the change of the refractive index according to the intensity of the light source passing through the optical waveguide. In general, the Ti diffused waveguide is subject to the photorefractive effect even in the input light source of 1 mW. Hence, the wavelength conversion laser based on the Ti diffused waveguide can produce only the light source less than 1 mW. Mostly, when the optical connection using the lenses 150 and 170 is adopted, the alignment is complicated and the interconnection loss is quite considerable.

After the optical condenser lens, the Ti diffused waveguide, and the optical collimating lens are aligned in the path of the laser light output from the laser diode, the optical power sensitively varies according to the external environment change and the set temperature.

FIG. 2 is a diagram of another conventional nonlinear waveguide.

An optical waveguide 210 generates periodic polarization inversion a and b by depositing $TiO_2$-doped-$Ta_2O_5$ over a $LiNbO_3$ nonlinear crystal wafer 220, forming a thin film, and then patterning.

The cycle of the periodic polarization inversion grating is determined by the wavelength of the second harmonic to generate. By controlling the thickness and the width of the $TiO_2$-doped-$Ta_2O_5$ thin film and the refractive index variation (2.2~2.4) based on the doping amount, the guided mode of the pumping light source and the second harmonic is optimized.

When the optical waveguide including the polarization-inverted area in a rib structure is formed using the thin-film deposition, the photorefractive effect of the diffused waveguide can be mitigated to some degree. However, since the ratio of Ti/(Ti+Ta) is regulated to control the refractive index, the photorefractive effect can be caused.

In addition, the optical connection method using the conventional lens causes the optical connection loss according to the temperature regulation.

Particularly, the conventional optical waveguides are subject to the difficult alignment of the laser optical path because of the external environment factors. As a result, it is hard to realize its product implementation in lack of specific methods for optimizing the loss of the input light source and the optical waveguide and enhancing the structure for the selection and the compactness of the packaging structure when the device is fabricated.

SUMMARY OF THE INVENTION

An aspect of the present invention is to address at least the above mentioned problems and/or disadvantages and to provide at least the advantages described below. Accordingly, an aspect of the present invention is to provide a nonlinear optical device. More particularly, the aspect of the present invention provides a wavelength conversion device package with less optical loss for stabilizing alignment of an optical oscillator, an optical transmitter, and a wavelength modulator even under an external environmental change, for example, in a temperature variation by providing a temperature regulating block and a temperature sensor to the optical oscillator and the wavelength modulator and using a flexible optical transmitter.

According to one aspect of the present invention, a wavelength conversion device package includes an optical oscillator comprising a light source for emitting a light; a flexible optical transmitter for transferring the light emitted from the optical oscillator to a wavelength modulator; and the wavelength modulator for receiving the light from the optical transmitter and radiating a wavelength-modulated light.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
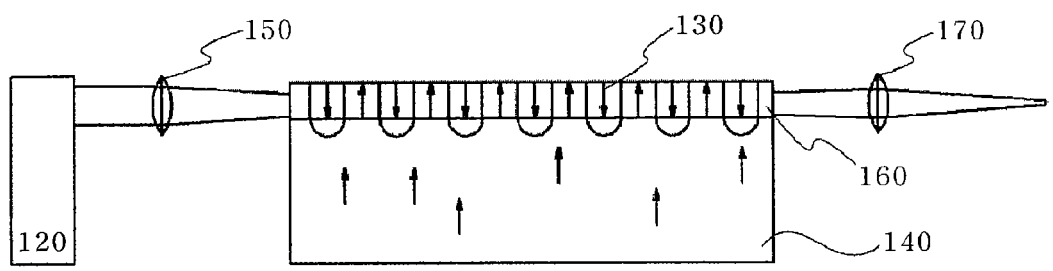
FIG. 1 is a diagram of a conventional nonlinear optical oscillator using a laser diode.
Figure 2:
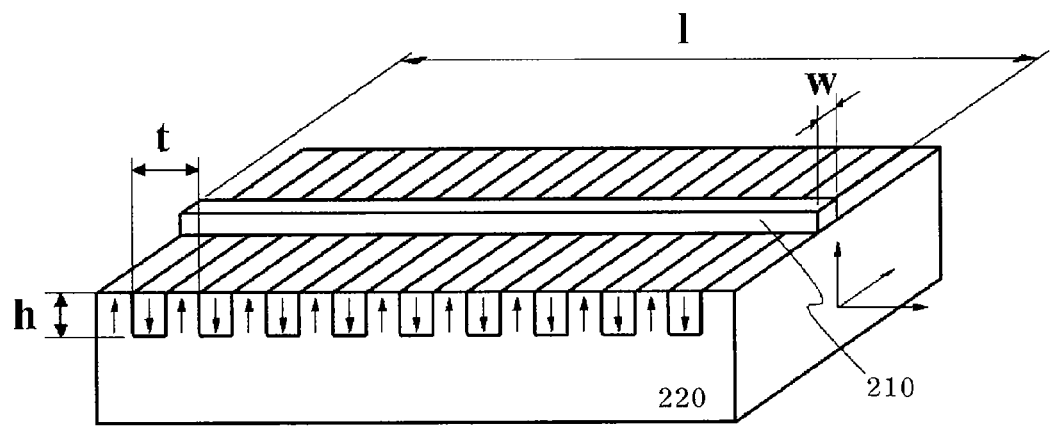
FIG. 2 is a diagram of a conventional nonlinear waveguide.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention are elucidated by referring to the drawings.

Figure 3:
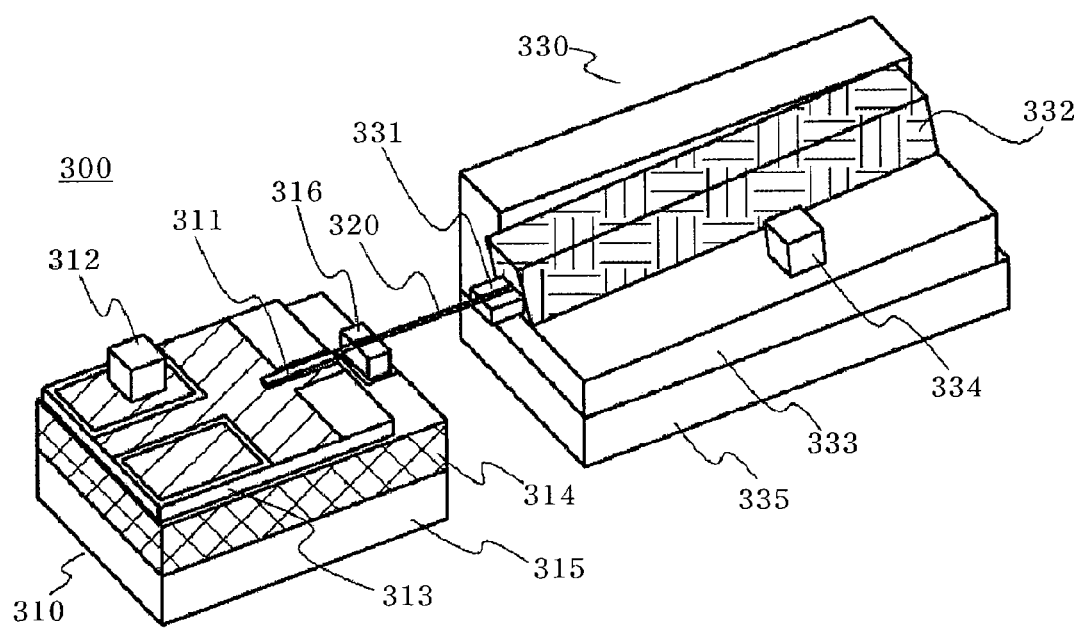
FIG. 3 is a perspective view of a wavelength conversion device package according to an exemplary embodiment of the present invention.

FIG. 3 is a perspective view of a wavelength conversion device package according to an exemplary embodiment of the present invention.

The wavelength conversion device package 300 of the present invention largely includes an optical oscillator 310, an optical transmitter 320, and a wavelength converter 330.

The optical oscillator 310 includes a chip-scale light source 311 including a laser diode for producing the light, a first temperature sensor 312 for measuring a temperature of the heat emitted from the light source 311, and a first mount block 313 for supporting the light source 311 and the first temperature sensor 312. Under the first mount block 313, a heat radiating block 314 for radiating the heat of the light source 311 to outside and a first temperature regulator 315 for regulating the temperature of the light source 311 are disposed. An optical transmitter securing block 316 is formed on the heat radiating block 314. The optical transmitter securing block 316 fixes the position of the optical transmitter 320 at a spot away from an output end of the light source 311 to project the light output from the light source 311 to the light transmitter 320.

In the optical oscillator 310, the optical transmitter 320 is used to transfer the light produced from the light source 311 to the wavelength converter 330. It is advantageous that the optical transmitter 320 employs a flexible optical fiber which can be bent.

The wavelength converter 330 includes an angle polishing block 331 for fixing the position of the optical transmitter 320, an optical waveguide 332 for receiving the light output from the optical transmitter 320 and converting its wavelength, a second mounting block 333 for supporting the optical waveguide 332, a second temperature sensor 334 for measuring a temperature of the optical waveguide 332, and a second temperature regulator 335 for regulating the temperature of the optical waveguide 332.

Figure 4:
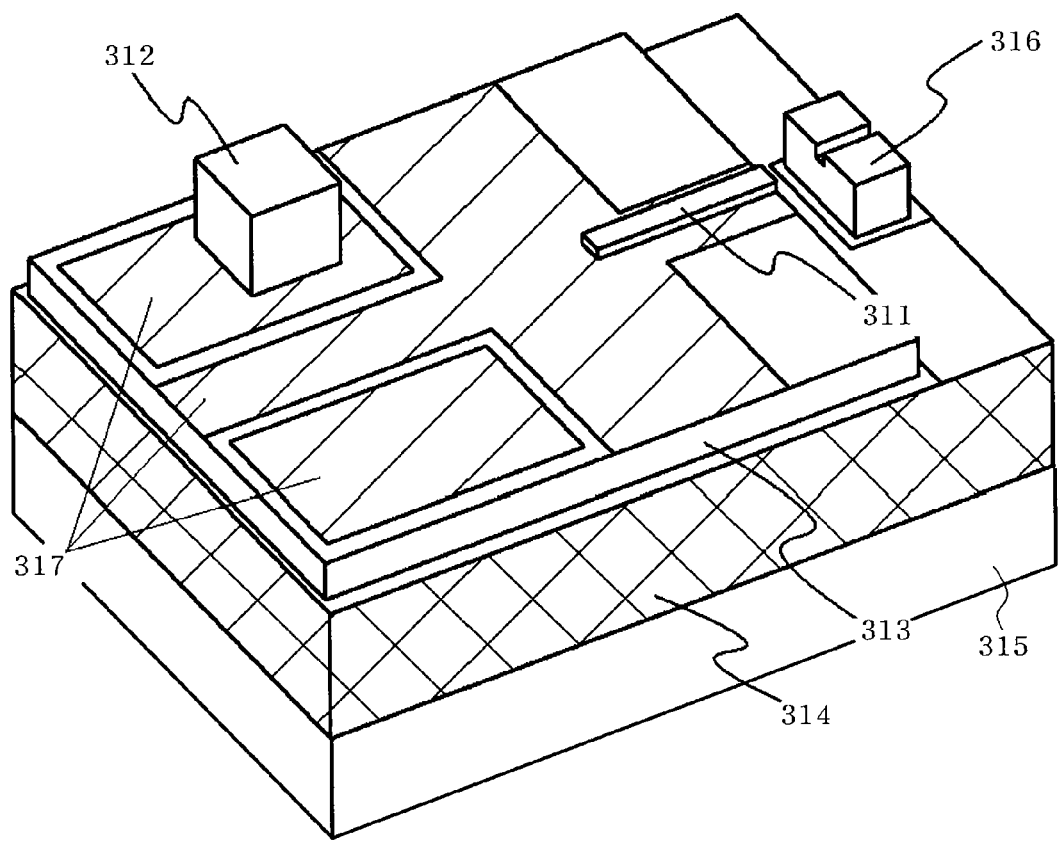
FIG. 4 is a perspective view of an optical oscillator according to an exemplary embodiment of the present invention.

FIG. 4 is a perspective view of the optical oscillator according to an exemplary embodiment of the present invention.

The optical oscillator includes a first temperature regulator 315, a light source heat radiating block 314, a first mount block 313, a first temperature sensor 312, a light source 311, and an optical transmitter securing block 316.

The light source of the present invention can employ a chip-scale diode light source or a diode light source including at least one of a wavelength line width regulating function and a wavelength tuning function.

Now, a fabrication process of the optical oscillator is described.

The light source heat radiating block 314 is bonded on the first temperature regulator 315, and the first mount block 313 and the optical transmitter securing block 316 are bonded on the light source heat radiating block 315.

The first mount block 313 can be formed using various materials such as silicone, AlN, W—Cu, or SiC. The first mount block 313 can be formed using two or more materials. In this case, a combination of a thermal conductor and a thermal barrier can be used. The material of the thermal barrier can use $ZrO_9$.

According to the present invention, the bonding uses a solder bonding. The solder material can use Au or Sn alloy such as Au—Sn, Au—Ag, Sn—Au—Cu, or Sn—Bi.

A metal or solder material is formed in the form of a thin film over the first mount block 313 using plating or deposition, and then patterned using photolithography to define an area of the light source 311, the first temperature sensor 312, and electrode pads 317 for applying voltages of the light source 311 and the first temperature sensor 312.

The light source 311 and the first temperature sensor 312 are placed on the patterned electrode pads 317 and their positions are precisely controlled using die bonder equipment. Next, they are pressed and bonded using ultrasonic waves, laser, or metal resistant plate heater.

Figure 5:
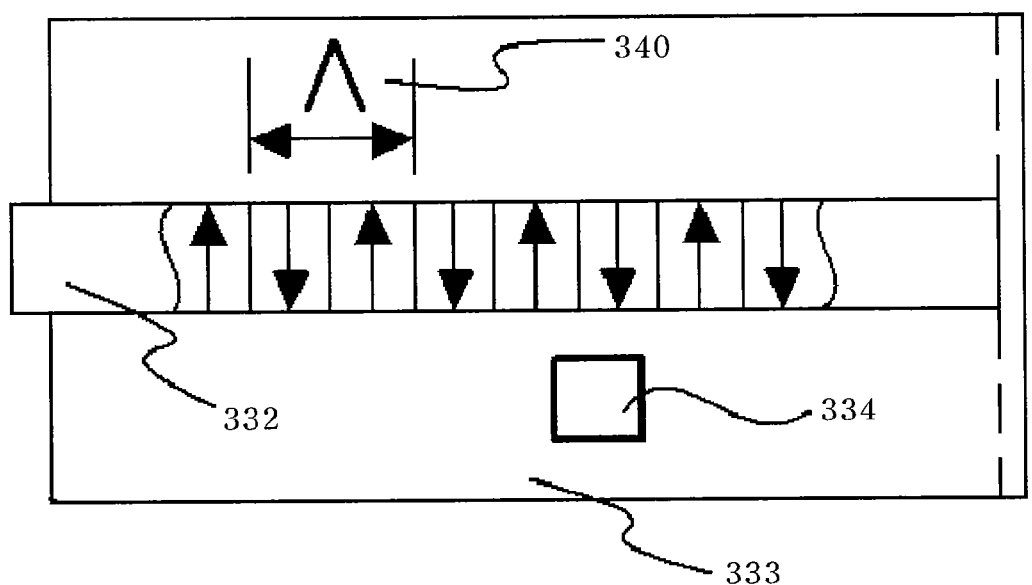
FIG. 5 is an upper view of a wavelength converter according to an exemplary embodiment of the present invention.

FIG. 5 is an upper view of the wavelength converter according to an exemplary embodiment of the present invention.

The optical waveguide 332 bonded on the second mount bock 333 includes a polarization inverted region 340 at regular intervals, and includes the second temperature sensor 334 for measuring the heat of the optical waveguide 332.

The polarization inversion cycle is set to make 50% of the polarization direction of the crystal '+' polarity and 50% '−' polarity. The optical effect of the periodically polarization inverted region gives rises to the conversion of the pumping light source to the different wavelength.

Figure 6:
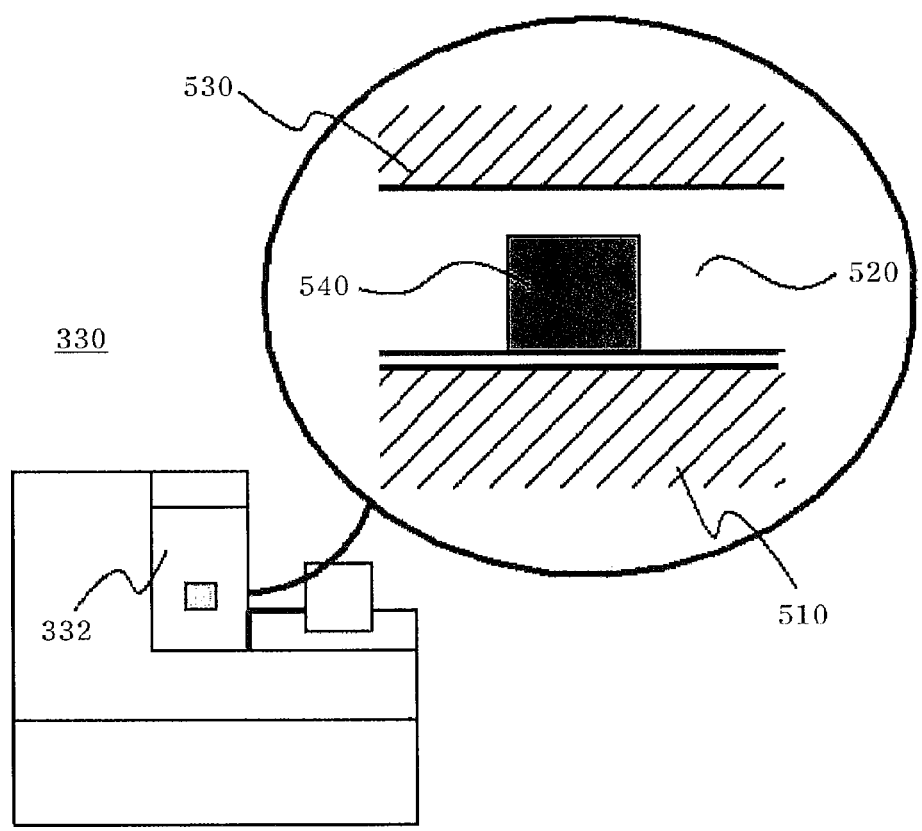
FIG. 6 is a side view of the wavelength converter according to an exemplary embodiment of the present invention.

FIG. 6 is a side view of the wavelength converter according to an exemplary embodiment of the present invention.

The optical waveguide 332 constituting the wavelength converter 330 includes a support block 510, a waveguide pipe 540 passed by the light and having the periodically polarization inverted region, a clad layer 520 for blocking the diffusion of the light, and a protection layer 530 for protecting the surface.

A process for forming the optical waveguide is now described.

A seed layer and a photoresist layer are formed on the ferroelectric substrate in order and the patterned photoresist layer is formed through the photolithography. Ni layer is formed between the photoresist layer patterns and the photoresist layer pattern is removed. Only the Ni thin film, which serves as the mask for the substrate etching, remains on the ferroelectric substrate.

The ferroelectric substrate with the metal mask is etched in the depth of about 1-10 um using a dry or wet etching method.

In this embodiment of the present invention, after the metal electrodes are formed on the un-etched surface of the ferroelectric body, the periodic polarization inversion is conducted by applying the external electric field. Alternatively, the polarization can be inverted by patterning an organic matter such as photoresist, on the etched surface of the substrate and applying the external electric field using a conductive liquid such as LiCl.

Since the optical waveguide is formed on the surface of the ferroelectric substrate, the etched surface is uneven. This roughness can spoil the waveguide and thus cannot be used as the device. To remove the unevenness, for example, the ferroelectric substrate is attached onto a circular jig formed with the ceramic material using a thermal wax. To uniformly grind the attached ferroelectric substrate, the surface of the ceramic jig needs to be formed in the flatness less than 1~3 μm. The attached ferroelectric substrate is grinded using a lapping machine and a chemical mechanical grinder. The grinded ferroelectric substrate passes through the cleaning and produces the optical waveguide substrate with the periodic polarized domain.

The waveguide fabrication process in the ridge form in the z-axis ferroelectric crystal is explained as follows.

As mentioned earlier, after the grinding and the cleaning, the waveguide substrate forms a z-axis substrate including the optical waveguide using the dry etching.

The masking material for the etching can employ Ni, Ti, Cr, or photoresist. The ferroelectric substrate including the optical waveguide periodically polarization switched is etched in the depth of 3~15 micrometers using the mask. The etched ferroelectric substrate produces the optical waveguide in the form of a trapezoid having the side angle of about 65°~85°, the wide bottom side, and the narrow upper side.

The substrate including the optical waveguide formed as above and a dummy substrate can be bonded using the ferroelectric substrate or a glass substrate having the low refractive index. A curable epoxy or wax which is hardened by UV radiation or thermal treatment is spread over the dummy substrate using a spin coating, or is directly bonded to the dummy substrate. When the epoxy or the wax is applied onto the dummy substrate, the surface etched in the ferroelectric substrate is bonded to the dummy substrate and then the contact sides of the two substrates are cured using the ultraviolet rays or the heat. In the case of the direct bonding, the substrates are bonded and treated with heat to increase the coherence. In so doing, it is preferred that the gap between the two substrates is uniform and the defects such as foreign substance or vacancy between the substrates is eliminated in advance.

The nonlinear wavelength converter using the optical waveguide formed as above makes use of the double refraction or the periodic polarization switch. A quasi phase matching cycle of the wavelength converter is determined based on the target frequency, the temperature applied to the wavelength converter, and the wavelength of the input pumping light source. The quasi phase matching cycle can be determined simply based on Equation (1) and Equation (2).

$$\frac{1}{\lambda i} + \frac{1}{\lambda s} = \frac{1}{\lambda p} \tag{1}$$

$$\frac{\Delta k_Q}{2\pi} = \frac{n_p}{\lambda_p} - \frac{n_s}{\lambda_s} - \frac{n_i}{\lambda_i} - \frac{m}{\Lambda_g} \tag{2}$$

Herein, n denotes the refractive index, p denotes the wavelength of the pumping light source, $\lambda s$ denotes a wavelength of a signal light source, $\lambda i$ denotes a wavelength of an idler light source, $\Lambda_g$ denotes the polarization inversion cycle, m denotes the quasi phase match order, and k denotes a phase difference.

The second harmonic has the wavelength, where $\lambda s$ is equal to $\lambda i$. Using this wavelength as the input pumping light source, the new $\lambda p$ can be produced, which is referred to as the second harmonic generation.

As one can see from Equation (2), to fix the wavelength and the polarization inversion cycle and to make k zero, it is necessary to regulate the refractive index.

To regulate the refractive index, a method for controlling the temperature of the device is applied. It is preferable to make the refractive index control temperature, which makes k zero, the most appropriate temperature of the device by precisely designing the polarization cycle. Note that the appropriate temperature varies according to the manufacturing process of the device.

Figure 7:
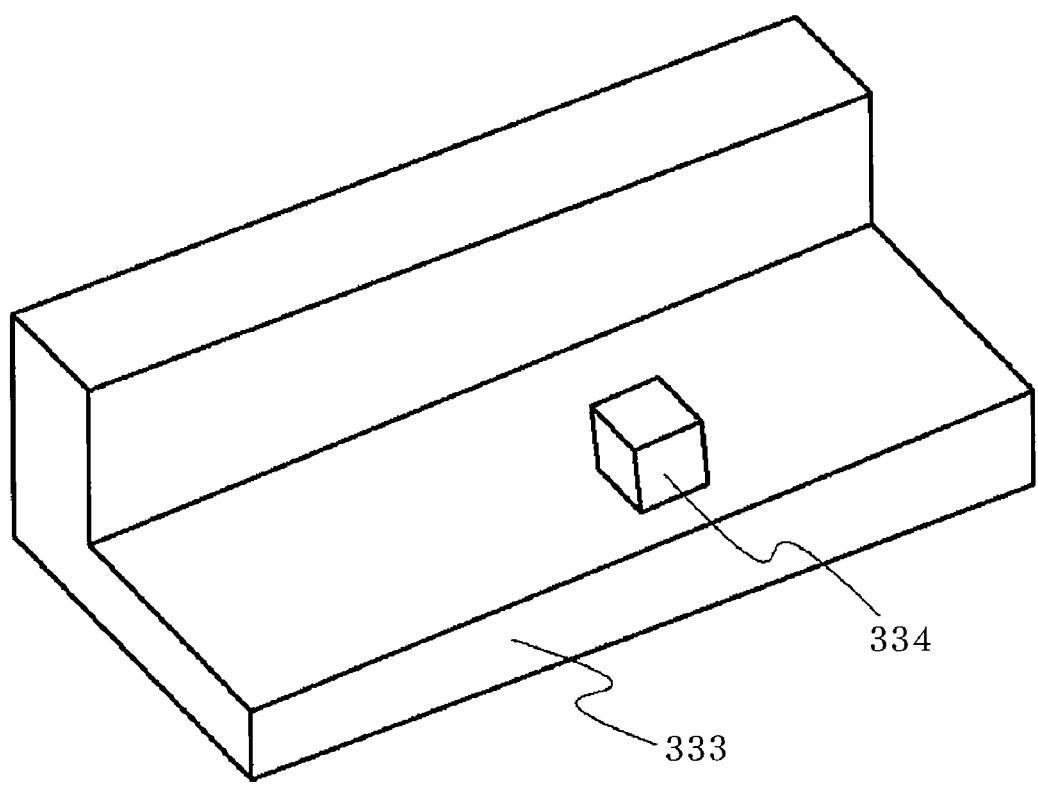
FIGS. 7 and 8 are diagrams of a process for forming the wavelength converter using an optical waveguide according to an exemplary embodiment of the present invention.
Figure 8:
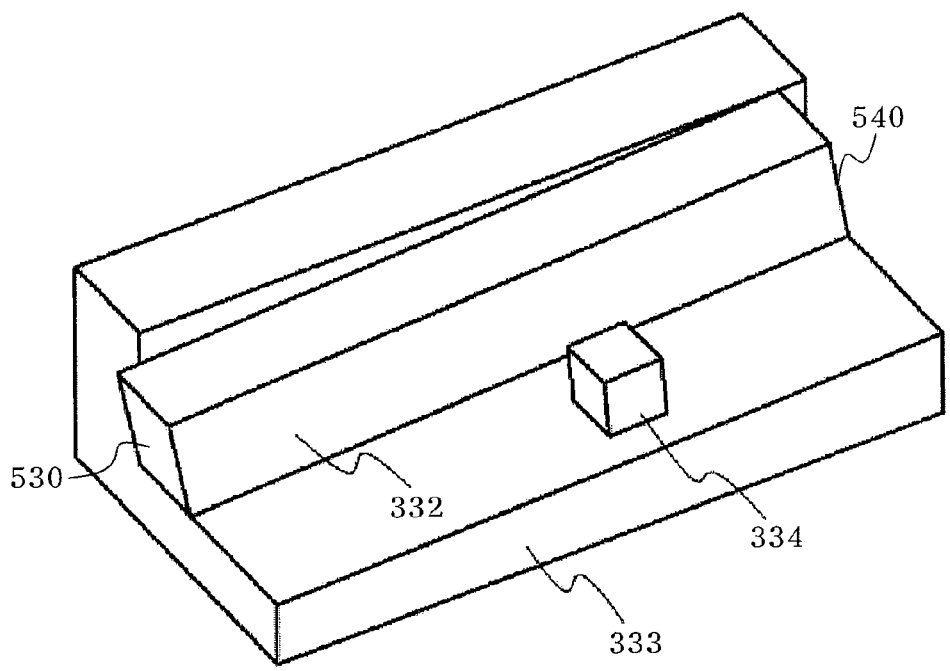

FIGS. 7 and 8 depict the process for forming the wavelength converter using the optical waveguide according to an exemplary embodiment of the present invention.

The second temperature sensor 334 is attached to the second mount block 333 using the solder bonding.

The solder bonding can use Au layer on the second mount block 333 using the plating or the deposition. Hence, the wire bonding process can be facilitated.

The material of the second mount block 333 can use W—Cu, or the thermal conductor such as Si, AlN or SiC. The second mount block 333 can employ two or more materials. In doing so, the combination of the thermal conductor and the thermal barrier can be employed. The material of the thermal barrier can be $ZrO_2$. Next, the optical waveguide 332 is bonded to the second mount block 333 using the solder bonding.

In this embodiment, the surface of the second mount block 333, where the optical waveguide 332 is bonded, is inclined. The both ends of the optical waveguide 332 to and from which the light irradiated from the optical transmitter 320 is input and output, are slanted through the surface dicing.

Figure 9:
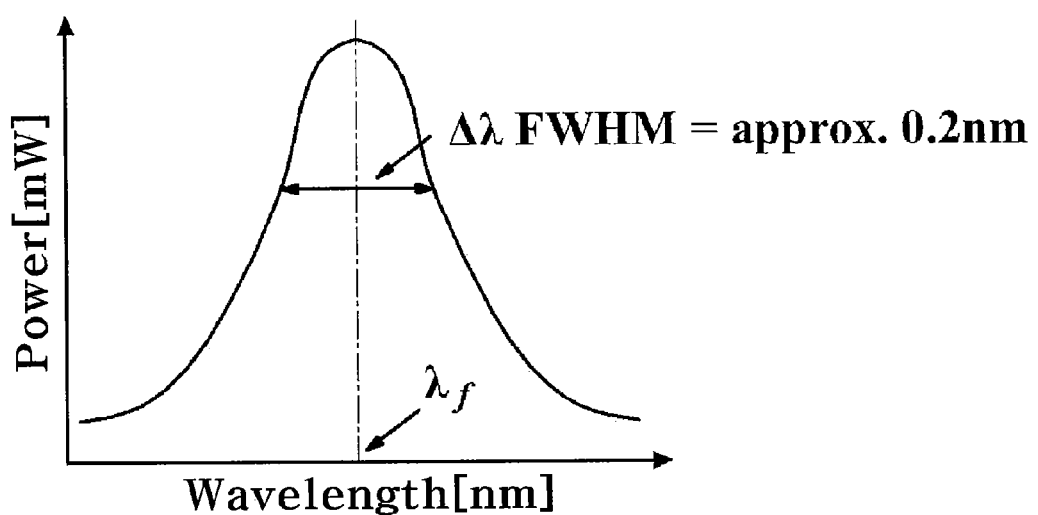
FIG. 9 is a graph showing a power change in a temperature control of the light output from the optical waveguide according to an exemplary embodiment of the present invention.

FIG. 9 is a graph showing a power change in the temperature control of the light output from the optical waveguide according to an exemplary embodiment of the present invention.

When the temperature of the polarization-inverted optical waveguide is not constant, the center frequency where the wavelength conversion is maximized is distorted and thus the power(mW) is deteriorated. The Full Width Half Maximum (FWHM) differs depending on the length of the optical waveguide. The longer optical waveguide, the narrower width of the FWHM.

To avoid such a situation, it is preferable to apply first and second optical thin film layers on the surface of the optical waveguide through which the light is input and output, in accordance with the wavelength conversion center frequency.

For instance, to generate the second harmonic of 532 nm using the light source having the wavelength of 1064 nm, it is preferable that the first optical thin film layer 530 forms a nonreflective thin film layer for 1064 nm and the second optical thin film layer 540 forms a nonreflective thin film layer for both of 1064 nm and 532 nm.

Figure 10:
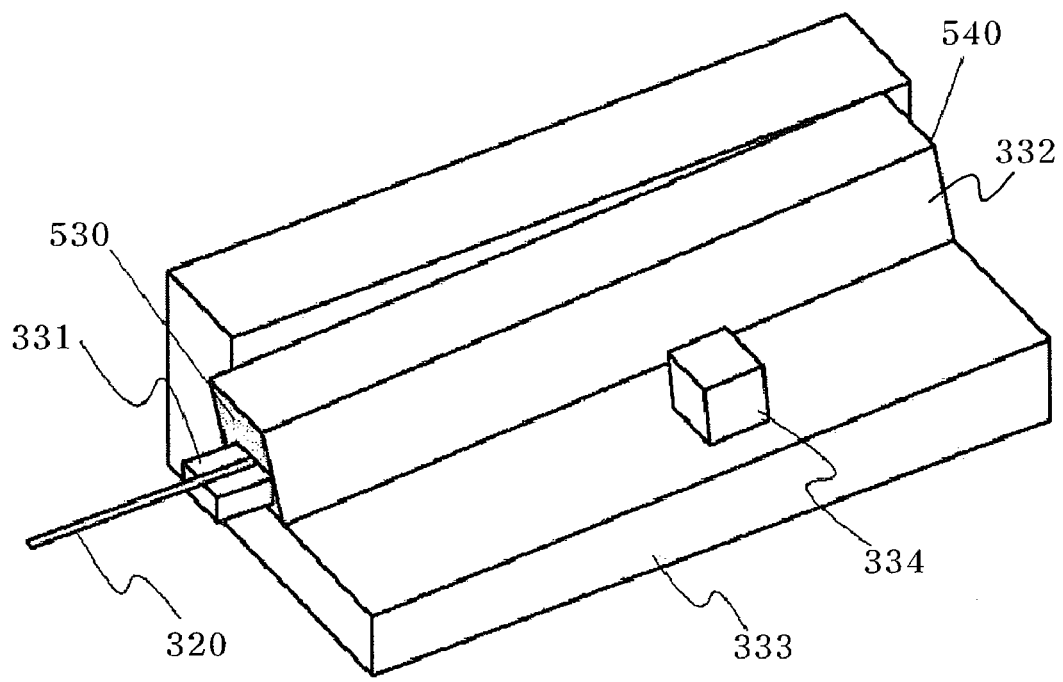
FIG. 10 is a diagram of an optical connection process of the wavelength converter and an optical transmitter according to an exemplary embodiment of the present invention.

FIG. 10 depicts the optical interconnection process of the wavelength converter and the optical transmitter according to an exemplary embodiment of the present invention.

The optical transmitter 320 is formed of the flexible optical fiber which can be bent as stated earlier. The wavelength converter 330 includes the angle polishing block 331 for securing the optical transmitter 320, the second mount block 333, the optical waveguide 332 including the optical thin film layers 530 and 540, and the second temperature sensor 334.

Since the light emitted from the light source of the optical transmitter 320 has the constant polarization mode (TE mode), it is necessary to match the polarization inversion direction generated within the optical waveguide 332 to the polarization direction of the light source. As described in FIG. 5, the optical waveguide 332 is bonded to the second mount block 333 to match the polarization inversion direction to the polarization direction of the light emitted from the light source.

In so doing, the optical waveguide uses the nonlinear crystal such as $LiNbO_3$ of Z-Cut. The nonlinear photonic crystal can be X, Y, Z-cut, or a certain axis according to the wafer cutting axis. Accordingly, the mounting direction of the optical waveguide depends on the axis of forming the periodic polarization.

The optical alignment of the present invention is now provided.

The light produced from the light source 311 to be used for the packaging or another source of the same wavelength as the light source 311 is projected to the optical transmitter 320.

The angle polishing block 331 which secures the flexible optical transmitter 320 is fixed to a jig (not shown), and then aligned using a precision control stage or an automated alignment equipment so as to minimize the loss of the optical interconnection irradiated from the angle polishing block 331 and the light source 311.

The second mount block 333 with the optical waveguide 332 mounted is secured to another jig and then aligned to optimally converge the light emitted from the flexible optical transmitter 320 to the polarization-inverted optical waveguide 332. When the alignment is completed, the epoxy of the excellent optical transmission is injected in between the angle polishing block 331 and the optical waveguide 332 and the UV is radiated using a UV curing apparatus. Thus, the optical alignment is secured and completed.

FIGS. 11 through 14 depict a packaging process according to an exemplary embodiment of the present invention.

Figure 11:
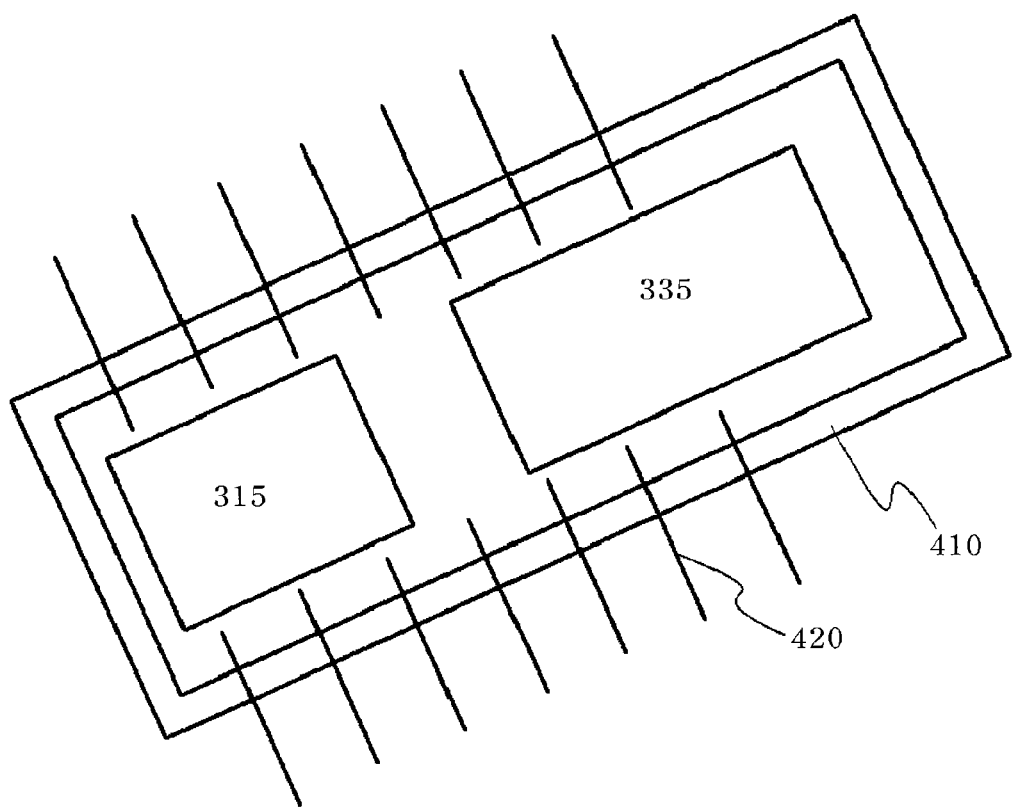
FIGS. 11 through 14 are diagrams of a packaging process according to an exemplary embodiment of the present invention.

The first temperature regulator 315 and the second temperature regulator 335 are attached to a housing 410 using the solder bonding as shown in FIG. 11. The material of the solder bonding can use Au alloys including Au—Sn, Sn—Ag or Sn—Ag—Cu, or Sn alloys such as Sn—Bi formed through the plating or the deposition. As the melting temperature of the solder material differs, the appropriate solder for the bonding process can be selected.

The first and second temperature regulators 315 and 335 can employ a Thermal Electric Cooler (TEC) or a thin-film resistant heater.

The housing 410 is fabricated together with metal pins 420 for the wire bonding. Preferably, the bottom of the housing 410 uses W—Cu, the exterior wall of the housing 410 uses a Kovar material, and the airtightness of the metal pins 420 and the housing 410 adopts a glass sealing.

Figure 12:
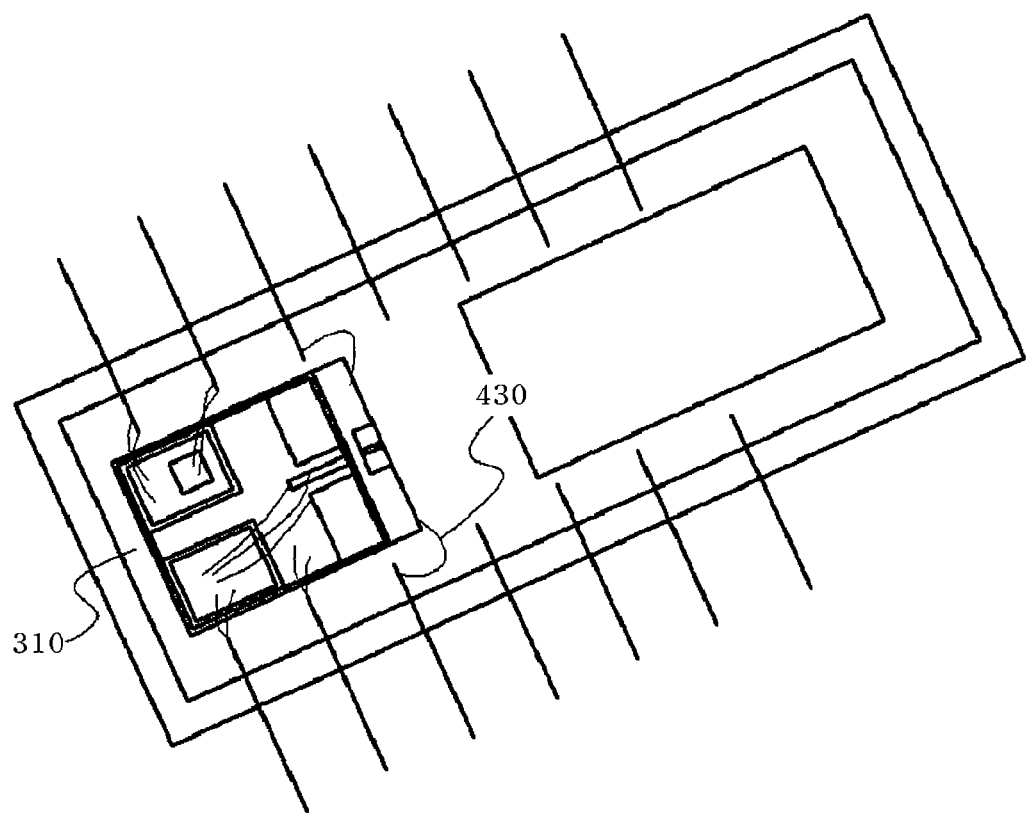

When the first and second temperature regulators 315 and 335 are bonded to the housing 410, the optical oscillator 310 is bonded to the first temperature regulator 315 as shown in FIG. 12. Preferably, the solder bonding is used for the optical oscillator 310 and the first temperature regulator 315. In doing so, it is necessary to consider the melting point of the solder in use based on the type of the first temperature regulator 315. For example, when the first temperature regulator 315 employs the TEC, a low-temperature solder or a thermally conductive epoxy is preferable.

It is advantageous that the first temperature regulator 312 and the chip-scale light source 311 such as Laser Diode (LD), which are bonded to the optical oscillator 310, form an electric wiring 430 through a gold wire bonding. Preferably, the solder bonding is used to joint the wiring 430 of the first temperature regulator 315 and the metal pins 420.

Figure 13:
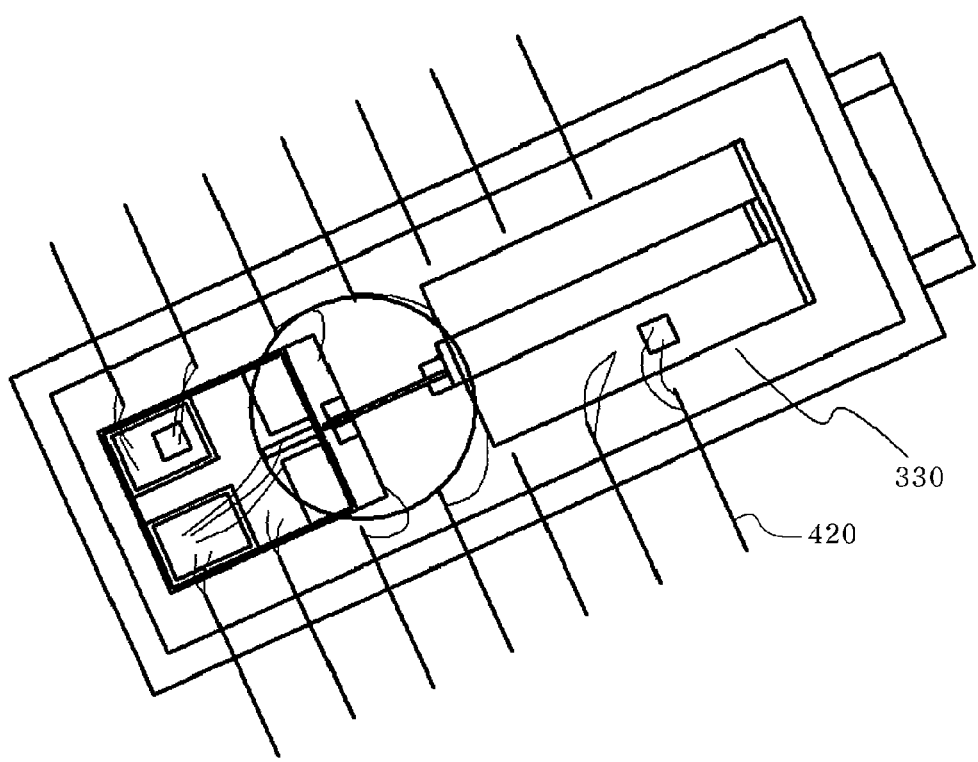

Next, the wavelength modulator 330 is bonded to the second temperature regulator 335. The wirings between the components formed in the second temperature regulator 335 and the wavelength modulator 330 and the metal pins 420 are bonded using the solder bonding as shown in FIG. 13.

Similar to the joint of the first temperature regulator 315 and the optical oscillator 310, it is preferable that the thermally conductive epoxy is used to joint the wavelength modulator 330 on the second temperature regulator 335.

Figure 14:
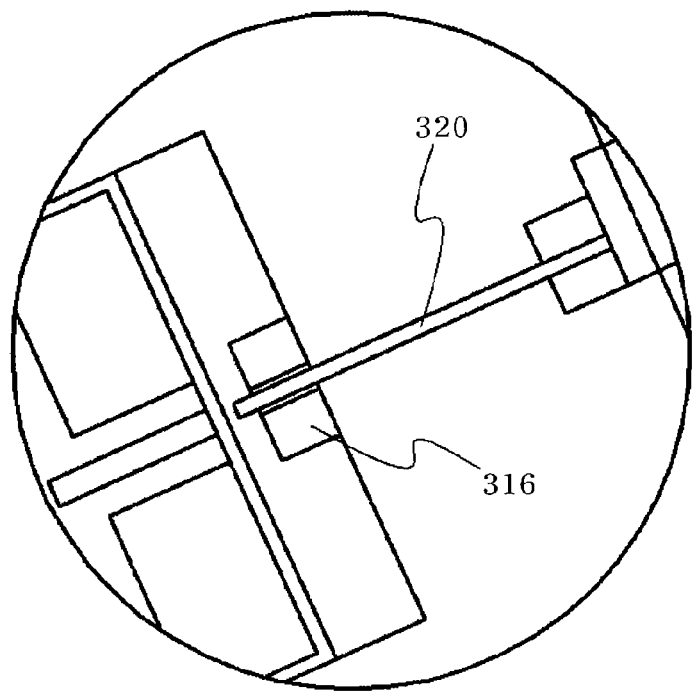

The joint using the epoxy spreads the epoxy over the second mount block 333 forming the wavelength modulator 330 and safely mounts to the second temperature regulator 335. At this time, the optical transmitter 320 secured to the wavelength modulator 330 is placed in the optical transmitter securing block 316 formed in the optical oscillator 310 using the jig of the precision stage or the automated alignment equipment, and then the optical alignment is performed. When the optical alignment is completed, the optical transmitter securing block 316 and the optical transmitter 320 is secured using the epoxy or the solder as shown in FIG. 14.

After the bonding is completed, the wavelength modulator 330 is separated from the jig without any misalignment, mounted on the second temperature regulator 335, and bonded to the housing 410 by applying the heat of about 40~100° C. together with the pressure. Alternatively, the boding can use a solder perform or a die bonder.

Figure 15:
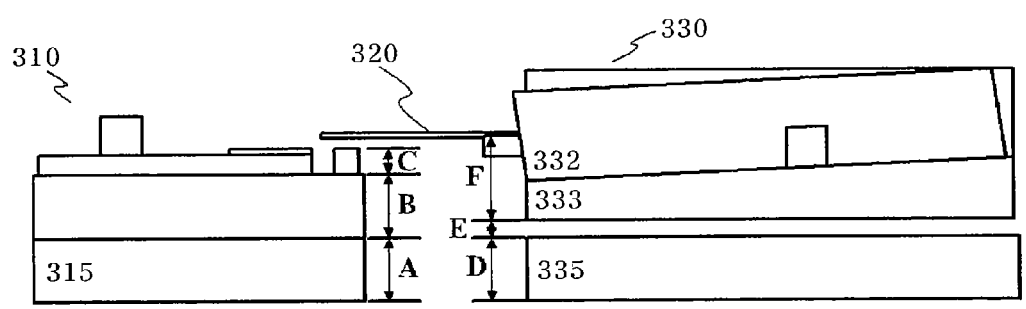
FIGS. 15, 16 and 17 are diagrams for an optical alignment process of the optical oscillator and the optical transmitter according to an exemplary embodiment of the present invention.
Figure 16:
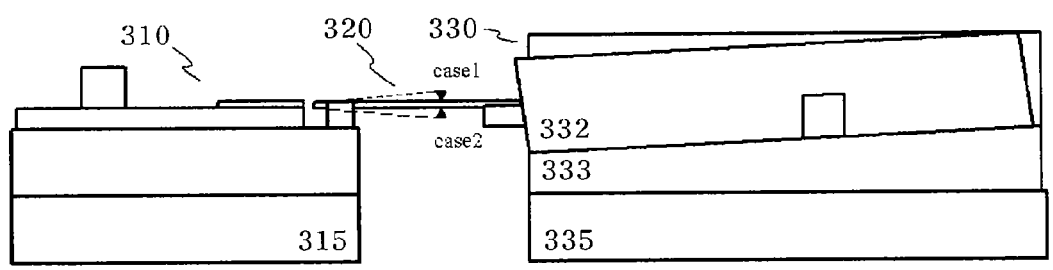
Figure 17:
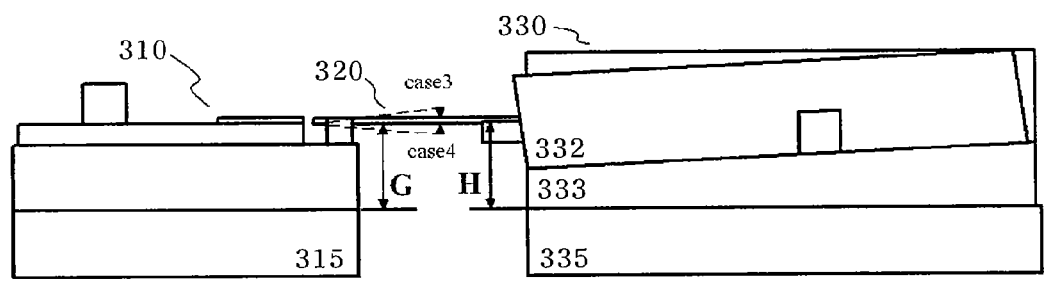

FIGS. 15, 16 and 17 depict the optical alignment process of the optical oscillator and the optical transmitter according to an exemplary embodiment of the present invention.

After the optical oscillator 310 is bonded to the housing, when the wavelength modulator 330 attached with the optical transmitter 320 is bonded to the housing, the optical transmitter 320 requires the optical alignment with the light source 311 of the optical oscillator 310.

The cause of the tolerance in the optical alignment is as follows.

After the wavelength modulator 330 is moved and optically aligned, the case2 is preferable for the bonding. For doing so, a method for intentionally applying (—) alpha tolerance to the dimension of F is used to give rise to the case2 at all times. In spite of the tolerance, it is preferable to use the optical transmitter having the flexible fiber for the sake of the packaging without the optical loss as shown in FIG. 16.

The package of the optical device is greatly affected by the temperature as stated earlier. After the optical alignment, the optical oscillator 310 and the wavelength modulator 330 bonded to the housing are kept at the constant temperature by means of the respective temperature regulators. Preferably, the temperature in the optimal condition varies according to the wavelength characteristic of the light source and the characteristic of the optical waveguide.

This temperature regulation characteristic varies according to the external environment, and the temperature affects G and H which is the finally aligned bonding height of the optical oscillator 310 and the wavelength modulator 330. When G and H fixed by the optical alignment are changed by the temperature, the optical alignment is deviated and the additional optical interconnection loss occurs.

Figure 18:
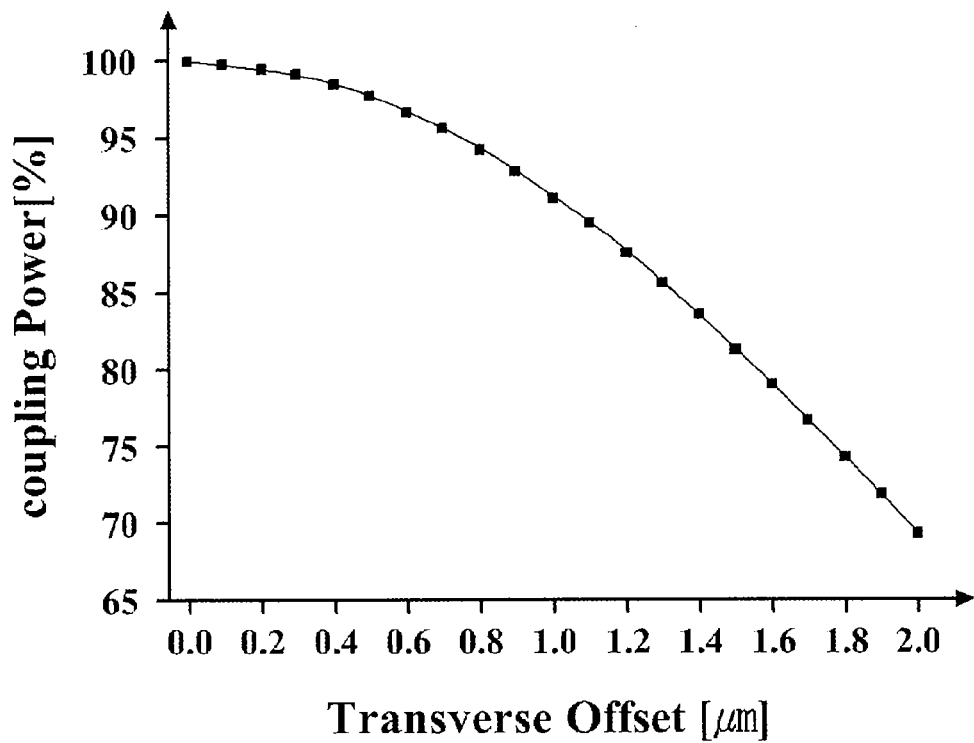
FIG. 18 is a graph showing an output loss of the light based on the optical misalignment.

FIG. 18 is a graph showing the output loss of the light based on the optical misalignment.

According to the present invention, the output loss of the light can be addressed by virtue of the optical transmitter using the radius of curvature of the flexible fiber which does not cause the loss even in the alignment distortion.

After the optical alignment as shown in FIG. 17, the optical transmitter 320 being bonded is in parallel with the housing surface. However, when G and H change according to the temperature, the case3 or the case4 may occur. In the optics using a lens, such a position difference in the submicron level causes the loss of the optical output which reduces the amount of the light from the light source to the optical waveguide. Since the first and second temperature regulators 315 and 335 of the present invention remove the optical loss based on the temperature variation, the wavelength conversion device with the stabilized optical characteristics can be manufactured.

Figure 19:
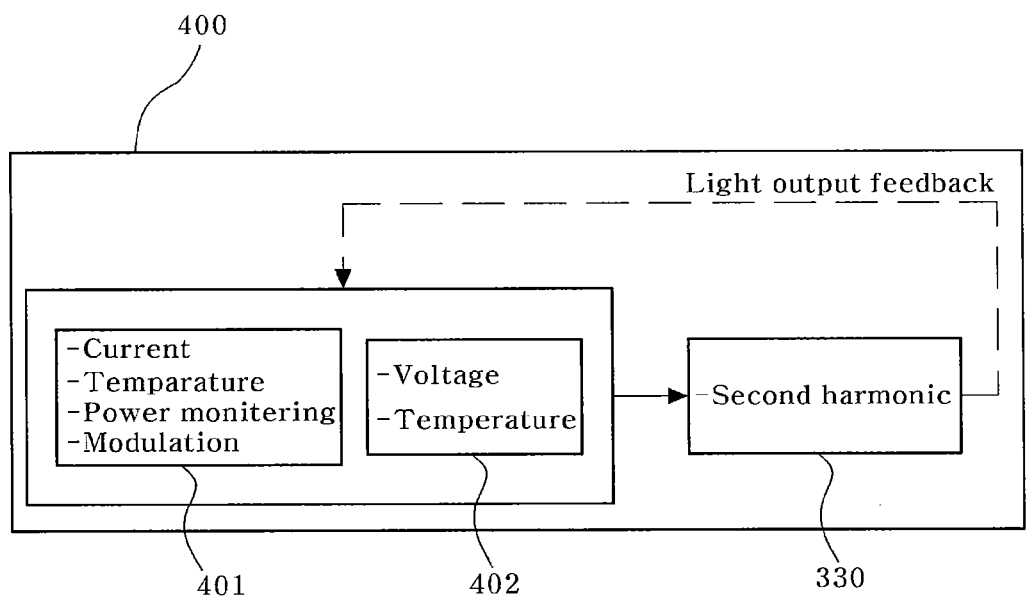
FIG. 19 is a diagram of a system configuration for characteristic assessment of the wavelength conversion device according to an exemplary embodiment of the present invention.

FIG. 19 depicts a system 400 configuration for characteristic assessment of the wavelength conversion device according to an exemplary embodiment of the present invention.

A light source controller 401 controls the current and the temperature applied to the light source of the optical oscillator, the power of the emitted light, and the modulation characteristic. A QPM controller 402 controls the voltage and the temperature applied to the wavelength modulator 330. The light output from the optical oscillator 310 is projected at the wavelength modulator 330 by way of the optical transmitter 320. The projected light is monitored and output as data. The output data is fed back to the light source controller 401 and the nonlinear QPM controller 402 repeatedly. Thus, the characteristic assessment of the wavelength conversion device is carried out.

Figure 20:
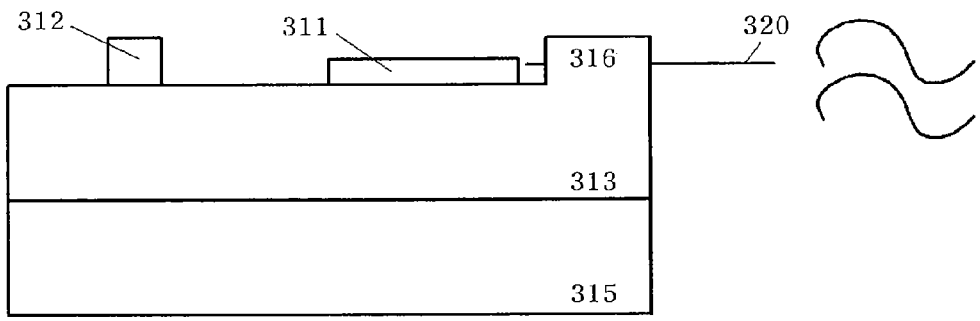
FIGS. 20 and 21 are diagrams of the optical oscillator according to one exemplary embodiment of the present invention.
Figure 21:
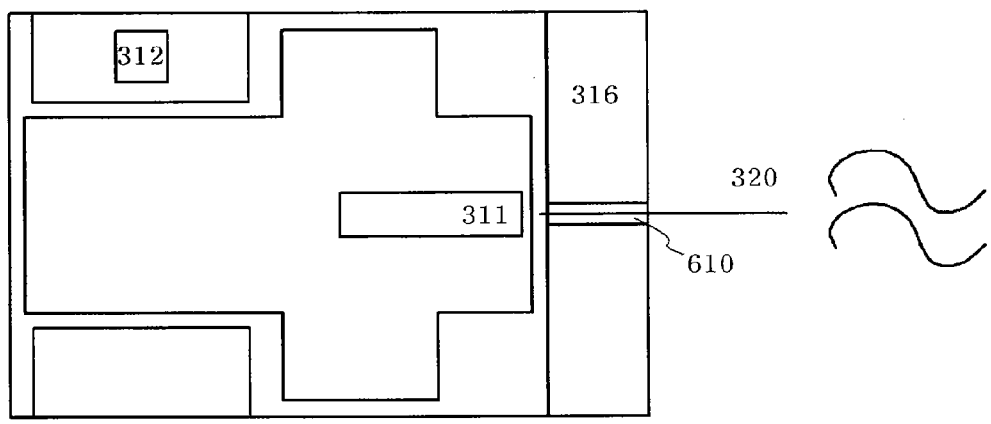

FIGS. 20 and 21 are diagrams of the optical oscillator according to one exemplary embodiment of the present invention.

The optical oscillator according to one exemplary embodiment of the present invention, can bond the first mount block 313 to the first temperature regulator 315, without using the heat radiating block 314 of FIG. 3. Advantageously, the optical transmitter securing block 316 of FIG. 3 can be removed together with the heat radiating block 314 of FIG. 3.

Preferably, the material of the first mount block 313 use a silicon wafer. The optical transmitter securing part 316 can be formed by applying the silicon wafer to the silicon semiconductor fabrication process.

It is preferable to form a guide groove 610 for safely receiving the optical transmitter 320 in the optical transmitter securing part 316 using the photolithography.

When the semiconductor fabrication process is adopted, the minute patterning is feasible. Thus, the optical alignment of the light source 311 and the optical transmitter 320 can be facilitated and the size of the packaging can be miniaturized.

Figure 22:
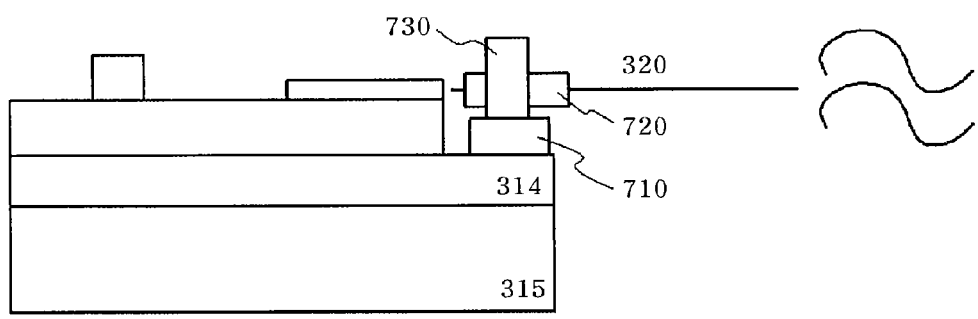
FIG. 22 is a diagram of the optical oscillator according to another exemplary embodiment of the present invention.

FIG. 22 is a diagram of the optical oscillator according to another exemplary embodiment of the present invention.

To form a fixing part for securing the optical transmitter, a clip mount 710 is bonded to the heat radiating block 314. The flexible optical transmitter 320 passes through the metal coating and then the solder bonding with a cylinder 320 of which the center is hollow. The cylinder 720 bonded with the optical transmitter 320 is bonded to a fixing clip 730. The fixing clip 730 is bonded to the clip mount 710.

In this embodiment, the boding process uses a laser welder. The optical alignment and joint using the laser welder features the compensation of the misalignment after the bonding using the additional welding work. By applying this configuration, the optical interconnection loss can be minimized and the package of the wavelength conversion device with the far enhanced characteristic can be produced.

Figure 23:
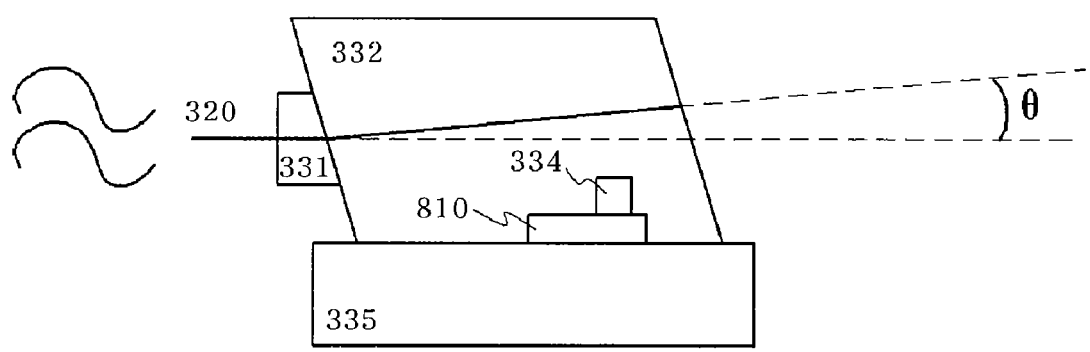
FIG. 23 is a side view of the wavelength converter according to an exemplary embodiment of the present invention.

FIG. 23 is a side view of the wavelength converter according to an exemplary embodiment of the present invention.

The optical waveguide 332 is fabricated at a certain angle with the lateral reference line of the optical waveguide 332. Mostly, the optical device applies the angle polishing block 331 to the device to avoid the damage and the characteristic deterioration of the light source in the reflection and to remove the reflected light. In general, the optical transmitter 320 applies 5°~9°.

To optically align the light emitted from the optical transmitter 320 with the optical waveguide 332 having the refractive index more than 4 by minimizing the loss as in the device of the present invention, it is preferable to apply the angle polishing block 331 of other angle than 8° to the optical waveguide 332.

In the embodiment of the present invention, 3°~8° is applied. The angle can be calculated according to the refractive index of the optical waveguide. Due to the angle difference of the angle polishing block 331, it is necessary to form the slope at the certain angle on the second mount block for mounting the optical waveguide as shown in FIG. 3.

To address this problem, when the optical waveguide 332 is diced to make a certain width, the angle is formed to differ from the traveling direction of the light within the waveguide pipe of the optical waveguide 332 by 1.5°~3.5°. This angle is differently applied according to the refractive index of the optical waveguide 332.

A sensor block 810 can be disposed under the second temperature sensor 334. Preferably, the sensor block 810 uses the same material as the optical waveguide 332.

The temperature regulation using the sensor block 810 can minimize the difference between the temperature inside the optical waveguide 332 and the temperature measured by the second temperature sensor 334. Since the optical waveguide 332 has the parallel side with the second temperature regulator 335, the second mount block 333 of FIG. 3 can be removed and thus the components required for the packaging can be reduced.

The display using the laser as the light source requires low-priced green, red, and blue light sources. The conventional techniques cannot yet manufacture the price-competitive light sources, excluding the red light source. In particular, the green light source has the diode pumped solid state laser using the diode pumping, whereas it suffers problems in the application of the optical modulation. While the laser light source for the display requires the optical modulation over several MHz, the conventional techniques have difficulty in implementing. However, the wavelength conversion device packaging of the present invention is applicable to the light source for the display, without suffering those shortcomings.

Even under the change of the temperature, the alignment of the optical oscillator, the optical transmitter, and the wavelength converter can be maintained. Therefore, the optical interconnection loss can be reduced and the power stability characteristic of the wavelength conversion device can be maximized.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A wavelength conversion device package comprises:
    an optical oscillator comprising a light source that emits light;
    a flexible optical transmitter that transfers the light emitted from the optical oscillator to a wavelength modulator; and
    wherein the wavelength modulator receives the light from the optical transmitter and radiates a wavelength-modulated light, and wherein the optical oscillator further comprises:
    a temperature sensor that measures a temperature of the light source;
    a first mount block that supports the light source and the temperature sensor; and
    a temperature regulator formed under the first mount block, that regulates a temperature of the light source, based on the temperature measured by the temperature sensor,
    wherein the optical oscillator comprises:
        a heat radiating block that is disposed between the first mount block and the temperature regulator, that supports the first mount block and that radiates a heat generated by the light source to outside; and
        a fixing part formed on the heat radiating block, that fixes the optical transmitter;
    wherein the wavelength modulator comprises:
        an optical waveguide that receives the light from the optical transmitter and that modulates a wavelength; and
        an angle polishing block that is formed at one end of the optical waveguide, that secures the optical transmitter and that optically aligns the light from the optical transmitter with the optical waveguide.

2. The wavelength conversion device package of claim 1, wherein a securing block that secures the optical transmitter is formed on the first mount block.

3. The wavelength conversion device package of claim 2, wherein a guide groove that safely receives the optical transmitter is formed in a surface of the securing block.

4. The wavelength conversion device package of claim 3, wherein the first mount block and the securing block are formed of the same material.

5. The wavelength conversion device package of claim 1, wherein the fixing part comprises:
    a cylinder in which an insertion hole for insertion of the optical transmitter is formed; and
    a fixing clip that fixes the cylinder.

6. The wavelength conversion device package of claim 1, wherein the light source uses a chip-scale light source comprising a laser diode.

7. The wavelength conversion device package of claim 1, wherein the wavelength modulator further comprises:
    a second mount block that supports the optical waveguide;
    a temperature sensor formed under the second mount block, that measures a temperature of the optical waveguide; and
    a temperature regulator that regulates the temperature of the optical waveguide, based on the temperature measured by the temperature sensor.

8. The wavelength conversion device package of claim 1, wherein the optical waveguide comprises a periodically polarization-inverted region using a ferroelectric substrate.

9. The wavelength conversion device package of claim 1, wherein both ends of the optical waveguide are slope-sided.

10. The wavelength conversion device package of claim 1, wherein both ends of the optical waveguide comprise a non-reflective thin film layer.

11. The wavelength conversion device package of claim 7, wherein the second mount block comprises an inclined side in a surface bonded with the optical waveguide.

12. The wavelength conversion device package of claim 1, wherein a slope of a waveguide pipe formed within the optical waveguide is 1.5°-3.5°.

13. The wavelength conversion device package of claim 1, wherein a slope of an angle polishing block surface contacting with the optical waveguide is 3°-8°.

14. The wavelength conversion device package of claim 1, wherein the optical oscillator and the wavelength modulator are connected to a housing which comprises a metal pin, using wire binding.

* * * * *